United States Patent
Zhao et al.

(10) Patent No.: US 12,549,315 B2
(45) Date of Patent: Feb. 10, 2026

(54) SIDELINK COMMUNICATION METHOD, APPARATUS, AND SYSTEM

(71) Applicant: Huawei Technologies Co., Ltd., Shenzhen (CN)

(72) Inventors: Li Zhao, Shenzhen (CN); Dongdong Wei, Shanghai (CN); Xiao Xiao, Shenzhen (CN); Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 572 days.

(21) Appl. No.: 17/937,305

(22) Filed: Sep. 30, 2022

(65) Prior Publication Data

US 2023/0023034 A1   Jan. 26, 2023

Related U.S. Application Data

(63) Continuation of application No. PCT/CN2021/085315, filed on Apr. 2, 2021.

(30) Foreign Application Priority Data

Apr. 9, 2020  (CN) .......................... 202010276021.1

(51) Int. Cl.
*H04W 72/21*  (2023.01)
*H04L 1/1812*  (2023.01)
(Continued)

(52) U.S. Cl.
CPC .......... *H04L 5/0055* (2013.01); *H04L 1/1812* (2013.01); *H04W 92/18* (2013.01)

(58) Field of Classification Search
CPC ... H04L 5/0055; H04L 1/1812; H04L 1/1861; H04W 92/18; H04W 72/21
See application file for complete search history.

(56) References Cited

U.S. PATENT DOCUMENTS 11,405,144 B2    8/2022  Park
2016/0295624 A1*  10/2016  Novlan .................. H04L 67/12
(Continued)

FOREIGN PATENT DOCUMENTS

| CN | 107736049 A | 2/2018 |
|---|---|---|
| CN | 110740016 A | 1/2020 |

(Continued)

OTHER PUBLICATIONS

3GPP TSG-RAN WG1 Meeting#98, R1-1908440 Title:LS response to RAN4 LS on clearificatin of UE capability for FDMed between PDSCH and CLI measurment resource (Year: 2019).*
(Continued)

*Primary Examiner* — Faruk Hamza
*Assistant Examiner* — Abusayeed M Haque
(74) *Attorney, Agent, or Firm* — Slater Matsil, LLP

(57) ABSTRACT

In an embodiment a sidelink communication method includes when a hybrid automatic repeat request (HARQ) feedback attribute of at least one sidelink logical channel of a first terminal device is enabled, obtaining, by the first terminal device from a network side device, one or more resource pools for the first terminal device, wherein a physical sidelink feedback channel (PSFCH) resource is configured in at least one of the resource pools.

16 Claims, 4 Drawing Sheets

(51) Int. Cl.
    *H04L 1/1829*     (2023.01)
    *H04L 5/00*     (2006.01)
    *H04W 92/18*     (2009.01)

(56) References Cited

U.S. PATENT DOCUMENTS

| | | | | |
|---|---|---|---|---|
| 2017/0048908 | A1* | 2/2017 | Matsumoto | H04L 1/12 |
| 2020/0008183 | A1* | 1/2020 | Chen | H04W 72/20 |
| 2020/0314959 | A1* | 10/2020 | Agiwal | H04W 92/18 |
| 2022/0393805 | A1* | 12/2022 | Guo | H04L 1/1854 |

FOREIGN PATENT DOCUMENTS

| | | | | |
|---|---|---|---|---|
| CN | 110943809 A | | 3/2020 | |
| WO | WO-2016129269 A2 | * | 8/2016 | H04W 72/20 |
| WO | 2019162430 A1 | | 8/2019 | |
| WO | WO-2021142583 A1 | * | 7/2021 | H04W 72/20 |

OTHER PUBLICATIONS

"Resource Pool (re-)selection Based on HARQ Feedback," Source: vivo, Agenda Item: 6.4.2.1, Document for: Discussion and Decision, 3GPP TSG-RAN WG2 Meeting #109-e, R2-2000282, E-Meeting, Feb. 24-Mar. 6, 2020, 4 pages.

"Miscellaneous MAC Issues for 5G V2X with NR Sidelink," Agenda Item: 6.4.3.1, Source: Spectrum Communications, Document for: Discussion and Decision, 3GPP TSG-RAN WG2 Meeting #109 Electronic, R2-2000562, E-Meeting, Feb. 24-Mar. 6, 2020, 4 pages.

"3rd Generation Partnership Project; Technical Specification Group Services and System Aspects; Study on enhancement of 3GPP Support for 5G V2X Services (Release 16)," 3GPP TR 22.886 V16.2.0, Dec. 2018, 76 pages.

"3rd Generation Partnership Project; Technical Specification Group Services and System Aspects; Enhancement of 3GPP support for V2X scenarios; Stage 1 (Release 16)," 3GPP TS 22.186 V16.2.0, Jun. 2019, 18 pages.

"3rd Generation Partnership Project; Technical Specification Group Radio Access Network; NR; Medium Access Control (MAC) protocol specification (Release 16)," 3GPP TS 38.321 V16.0.0, Mar. 2020, 141 pages.

"3rd Generation Partnership Project; Technical Specification Group Radio Access Network; NR; Radio Resource Control (RRC) protocol specification (Release 16)," 3GPP TS 38.331 V16.0.0, Mar. 2020, 835 pages.

"On SL LCP mapping restriction for HARQ feedback enable and disable," Agenda Item: 6.4.3.1, Source: Huawei, HiSilicon, Document for: Discussion and decision, 3GPP TSG-RAN WG2 Meeting# 109 electronic, R2-2000709, Feb. 24-Mar. 6, 2020, 6 pages.

"Discussion on remaining MAC open issues for 5G V2X with NR SL," Agenda Item: 6.4.2.1, Source: Huawei, HiSilicon, Document for: Discussion and Decision, 3GPP TSG-RAN WG2 Meeting #109-bis electronic, R2-20xxxxx, R2-2003555, Apr. 20-30, 2020, 28 pages.

* cited by examiner

SIDELINK COMMUNICATION METHOD, APPARATUS, AND SYSTEM

CROSS-REFERENCE TO RELATED APPLICATIONS

This is a continuation application of International Application No. PCT/CN2021/085315, filed on Apr. 2, 2021, which claims priority to Chinese Patent Application No. 202010276021.1, filed on Apr. 9, 2020.application is hereby incorporated herein by reference.

TECHNICAL FIELD

This application relates to the communication field, and in particular, to a sidelink communication method, an apparatus, and a system.

BACKGROUND

On a new radio (NR) sidelink (SL), for an SL communication resource pool preconfigured in user equipment (UE) or configured by a network side for the UE, a resource pool is a set of time-frequency resources. A resource used by the UE to perform communication on the SL is determined from the resource pool configured by the network side.

When transmit UE (TX UE) performs initial transmission on a sidelink grant, the TX UE sends a medium access control packet data unit (MAC PDU). If a physical uplink control channel (PUCCH) resource is configured for the TX UE and the sl grant has an associated physical sidelink feedback channel (PSFCH) resource, but a hybrid automatic repeat request (HARQ) feedback attribute of the MAC PDU is disabled, unnecessary retransmission is caused due to lack of HARQ information feedbacks on a PUCCH, and resources are wasted.

SUMMARY

Embodiments provide a sidelink communication method, an apparatus, and a system, to avoid unnecessary retransmission and save resources.

A first embodiment provides a sidelink communication method. The method includes: If a first terminal device determines that a HARQ feedback attribute of a logical channel (LCH) in a MAC PDU is disabled, and a network side device has configured a PUCCH resource for the first terminal device and has configured an associated PSFCH resource for an sl grant used to send the MAC PDU, the first terminal device may send a first request message to a second terminal device, to request the second terminal device to perform HARQ feedback for the MAC PDU.

In this application, the MAC PDU is in initial transmission on the sl grant. In other words, the MAC PDU is data newly transmitted by the first terminal device on the sl grant.

According to the foregoing method, if the LCH in the MAC PDU newly transmitted by the first terminal device on the sl grant does not support the HARQ feedback, but the network side device has configured the PUCCH resource for the first terminal device and the PSFCH resource associated with the sl grant, the first terminal device may request the second terminal device to perform HARQ feedback for the MAC PDU. In this way, unnecessary retransmission is avoided, and resources are saved.

According to the first embodiment, in some possible implementations, the first request message may include control information. Correspondingly, the method may further include: The first terminal device sets a HARQ feedback attribute in the control information to enabled.

In this application, the HARQ feedback attribute may be indicated by using one or more bits in the control information. In this case, the first terminal device sets, to enabled, the bit that is in the control information and that indicates the HARQ feedback attribute.

According to the first embodiment, in some possible implementations, the control information may be sidelink control information (SCI). In other words, the first terminal device sends the SCI to the second terminal device, to request the second terminal device to perform HARQ feedback for the MAC PDU.

According to the first embodiment, in some possible implementations, the method may further include: The first terminal device receives HARQ feedback information sent by the second terminal device, namely, an answer message of the second terminal device for the first request information; and if the HARQ feedback information is acknowledgment (ACK) information, the first terminal device sends the acknowledgment information to the network side device on the PUCCH resource; or if the HARQ feedback information is negative acknowledgment information, the first terminal device sends the negative acknowledgment information to the network side device on the PUCCH resource. In this way, unnecessary retransmission is avoided, and resources are saved.

A second embodiment provides a sidelink communication method. The method includes: A second terminal device receives a first request message; and the second terminal device performs, on a PSFCH, HARQ feedback for a MAC PDU in response to the first request message.

According to the second embodiment, in some possible implementations, that the second terminal device performs, on a PSFCH, HARQ feedback for a MAC PDU in response to the first request message includes: The second terminal device sends HARQ feedback information to a first terminal device in response to the first request message.

According to the second embodiment, in some possible implementations, the first request message may include control information. Further, the control information may be SCI. In other words, the second terminal device receives the SCI from the second terminal device, and performs HARQ feedback for the MAC PDU to the first terminal device based on the SCI.

A third embodiment provides a sidelink communication method. The method includes: If a first terminal device determines that a HARQ feedback attribute of an LCH in a MAC PDU is enabled, and no associated PSFCH resource is configured for an sl grant used to send the MAC PDU, the first terminal device ignores the sl grant.

In this application, the MAC PDU is in initial transmission on the sl grant.

According to the foregoing method, if the LCH in the MAC PDU sent by the first terminal device on the sl grant supports HARQ feedback, it indicates that the HARQ feedback is expected to be performed for the MAC PDU; however, no associated PSFCH resource is configured for the sl grant. In this case, because the sl grant does not support the HARQ feedback, the first terminal device ignores the sl grant, to avoid a case in which the HARQ feedback attribute of the MAC PDU does not match a resource configured for UE, and further avoid unnecessary retransmission or a packet loss caused by lack of retransmission.

According to the third embodiment, in some possible implementations, that the first terminal device ignores the sl grant includes: The first terminal device skips sending the MAC PDU to a third terminal device by using the sl grant.

A fourth embodiment provides a sidelink communication method. The method includes: If a first terminal device determines that a HARQ feedback attribute of an LCH in a MAC PDU is enabled, and no associated PSFCH resource is configured for an sl grant used to send the MAC PDU, the first terminal device sends a second request message to a network side device, where the second request message requests the network side device to allocate a PSFCH resource.

In this application, the MAC PDU is in initial transmission on the sl grant.

According to the foregoing method, if the LCH in the MAC PDU sent by the first terminal device on the sl grant supports HARQ feedback, it indicates that the HARQ feedback is expected to be performed for the MAC PDU; however, no associated PSFCH resource is configured for the sl grant. In this case, the first terminal device requests the network side device to allocate a PSFCH resource, so that a second terminal device can perform HARQ feedback for the MAC PDU on the newly configured PSFCH resource, to avoid a case in which the HARQ feedback attribute of the MAC PDU does not match a resource configured for UE, and further avoid unnecessary retransmission or a packet loss caused by lack of retransmission.

According to the fourth embodiment, in some possible implementations, the second request message may include the HARQ feedback attribute of the MAC PDU; and that the first terminal device sends a second request message to a network side device includes: The first terminal device sends the HARQ feedback attribute of the MAC PDU to the network side device.

According to the fourth embodiment, in some possible implementations, the second request message may include a MAC control element (CE) or radio resource control (RRC) signaling. Certainly, other signaling may be further included. This is not specifically limited in this embodiment of this application.

In this application, the second request message directly indicates, by using signaling, the network side device to allocate the PSFCH resource, or may indicate the HARQ feedback attribute of the MAC PDU by using signaling, so that the network side device may allocate the PSFCH resource based on the HARQ feedback attribute of the MAC PDU.

According to the fourth embodiment, in some possible implementations, the second request message requests the network side device to reconfigure a PSFCH resource associated with the sl grant; or the second request message requests the network side device to reallocate a resource pool, where a PSFCH resource is configured in the reallocated resource pool. To be specific, the first terminal device may request the network side device to allocate a PSFCH resource to a current resource pool, so that the associated PSFCH resource is configured for the sl grant used to transmit the MAC PDU. Alternatively, the first terminal device may request the network side device to reselect a new resource pool for the first terminal device, where a PSFCH resource is configured in the new resource pool, so that similarly, the associated PSFCH resource can be configured for the sl grant used to transmit the MAC PDU, and the second terminal device may perform HARQ feedback for the MAC PDU on the newly configured PSFCH resource.

The fifth embodiment=provides a sidelink communication method. The method includes: A network side device receives a second request message from a first terminal device; and the network side device allocates a PSFCH resource to the first terminal device in response to the second request message.

According to the fifth embodiment, in some possible implementations, the second request message may include a HARQ feedback attribute of a MAC PDU; and that a network side device receives a second request message from a first terminal device includes: The network side device receives the HARQ feedback attribute of the MAC PDU from the first terminal device.

According to the fifth embodiment, in some possible implementations, the second request message may include a MAC CE or RRC signaling. Certainly, other signaling may be further included. This is not specifically limited in this embodiment of this application.

In this application, the second request message directly indicates, by using signaling, the network side device to allocate the PSFCH resource, or may indicate the HARQ feedback attribute of the MAC PDU by using signaling, so that the network side device may allocate the PSFCH resource based on the HARQ feedback attribute of the MAC PDU.

According to the fifth embodiment, in some possible implementations, the second request message requests the network side device to reconfigure a PSFCH resource associated with the sl grant; or the second request message requests the network side device to reallocate a resource pool, where a PSFCH resource is configured in the reallocated resource pool. To be specific, the first terminal device may request the network side device to allocate a PSFCH resource to a current resource pool, so that the associated PSFCH resource is configured for the sl grant used to transmit the MAC PDU. Alternatively, the first terminal device may request the network side device to reselect a new resource pool for the first terminal device, where a PSFCH resource is configured in the new resource pool, so that similarly, the associated PSFCH resource can be configured for the sl grant used to transmit the MAC PDU, and the second terminal device may perform HARQ feedback for the MAC PDU on the newly configured PSFCH resource.

A sixth embodiment provides a sidelink communication method. The method includes: If a HARQ feedback attribute of at least one LCH configured by a network side device for a first terminal device is enabled, the network side device configures one or more resource pools for the first terminal device, where a PSFCH resource is configured in at least one of the configured resource pools.

According to the foregoing method, when configuring a resource for the first terminal device, if the configured LCH supports HARQ feedback, the network side device needs to correspondingly configure a PSFCH resource for the first terminal device, that is, the network side device configures the one or more resource pools for the first terminal device, where the PSFCH resource is configured in the at least one of the configured resource pools. In this case, a second terminal device may perform HARQ feedback for a MAC PDU on the configured PSFCH resource, to avoid a case in which a HARQ feedback attribute of the MAC PDU does not match a resource configured for UE, and further avoid unnecessary retransmission or a packet loss caused by lack of retransmission.

In this application, if the network side device configures one resource pool for the first terminal device, a PSFCH resource is correspondingly configured in the resource pool; or if the network side device configures a plurality of resource pools for the first terminal device, a PSFCH resource is correspondingly configured in at least one of the plurality of resource pools. In this way, the first terminal device can configure the LCH that supports the HARQ feedback, and has a corresponding PSFCH resource. Correspondingly may also be understood as accordingly, or may be understood as having an association relationship.

A seventh embodiment provides a sidelink communication method. The method includes: If a first terminal device determines that a HARQ feedback attribute of an LCH in a MAC PDU is enabled, and no associated PSFCH resource is configured for an sl grant used to send the MAC PDU, the first terminal device enters an idle mode or a third (inactive) mode, and performs resource reselection, where a PSFCH resource is configured in a reselected resource pool.

In this application, the MAC PDU is in initial transmission on the sl grant.

According to the foregoing method, if the LCH in the MAC PDU sent by the first terminal device on the sl grant supports HARQ feedback, it indicates that the HARQ feedback is expected to be performed for the MAC PDU; however, no associated PSFCH resource is configured for the sl grant. In this case, the first terminal device may enter the idle mode or the third mode, to perform resource reselection, so that the PSFCH resource is configured in the reselected resource pool. In this case, a second terminal device may perform HARQ feedback for the MAC PDU on the reselected PSFCH resource, to avoid a case in which the HARQ feedback attribute of the MAC PDU does not match a resource configured for UE, and further avoid unnecessary retransmission or a packet loss caused by lack of retransmission.

According to the seventh embodiment, in some possible implementations, the method further includes: The first terminal device switches to a sidelink mode 2 after entering the idle mode or the third mode.

An eighth embodiment provides a sidelink communication method. The method includes: If a first terminal device determines that a HARQ feedback attribute of an LCH in a MAC PDU is enabled, and no associated PSFCH resource is configured for an sl grant used to send the MAC PDU, the first terminal device reselects a DST.

In this application, the MAC PDU is in initial transmission on the sl grant.

According to the foregoing method, if the LCH in the MAC PDU sent by the first terminal device on the sl grant supports HARQ feedback, it indicates that the HARQ feedback is expected to be performed for the MAC PDU; however, no associated PSFCH resource is configured for the sl grant. In this case, the first terminal device may reselect the DST, and an LCH associated with the reselected DST may not support the HARQ feedback, to avoid a case in which the HARQ feedback attribute of the MAC PDU does not match a resource configured for UE, and further avoid unnecessary retransmission or a packet loss caused by lack of retransmission.

According to the eighth embodiment, in some possible implementations, the DST is a DST determined based on an LCH or a MAC CE, and the LCH or the MAC CE has a highest priority in a plurality of LCHs or MAC CEs that satisfy a preset condition, where the preset condition includes at least: HARQ feedback attributes of the plurality of LCHs or MAC CEs are disabled.

A ninth embodiment provides a sidelink communication method. The method includes: If a first terminal device determines that a HARQ feedback attribute of an LCH in a MAC PDU is enabled, and no associated PSFCH resource is configured for an sl grant used to send the MAC PDU, the first terminal device sends a third request message to a second terminal device, where the third request message requests the second terminal device not to perform HARQ feedback for the MAC PDU.

In this application, the MAC PDU is in initial transmission on the sl grant.

According to the ninth embodiment, in some possible implementations, the third request message may include control information. Correspondingly, the method may further include: The first terminal device sets a HARQ feedback attribute in the control information to disabled.

In this application, the HARQ feedback attribute may be indicated by using one or more bits in the control information. In this case, the first terminal device sets, to disabled, the bit that is in the control information and that indicates the HARQ feedback attribute.

According to the foregoing method, if the LCH in the MAC PDU sent by the first terminal device on the sl grant supports HARQ feedback, it indicates that the HARQ feedback is expected to be performed for the MAC PDU; however, no associated PSFCH resource is configured for the sl grant. In this case, the first terminal device requests the second terminal device not to perform HARQ feedback for the MAC PDU, to avoid a case in which the HARQ feedback attribute of the MAC PDU does not match a resource configured for UE, and further avoid unnecessary retransmission or a packet loss caused by lack of retransmission.

A tenth embodiment provides a sidelink communication method. The method includes: A second terminal device receives a third request message sent by a first terminal device, where the third request message requests the second terminal device not to perform HARQ feedback for a MAC PDU; and the second terminal device does not perform HARQ feedback for the MAC PDU in response to the third request information.

According to the tenth embodiment, in some possible implementations, the third request message may include control information, and a HARQ feedback attribute in the control information is set to disabled.

An eleventh embodiment provides a communication apparatus. The communication apparatus may be a chip or a system on chip in a first terminal device, or may be a functional module that is in the first terminal device and that is configured to implement the method in any one of the first embodiment or the possible implementations of the first embodiment. The communication apparatus may include a sending module and a processing module. The sending module is configured to: if the processing module determines that a HARQ feedback attribute of an LCH in a MAC PDU is disabled, and a network side device has configured a PUCCH resource for the first terminal device and has configured an associated PSFCH resource for an sl grant used to send the MAC PDU, send a first request message to a second terminal device, where the first request message requests the second terminal device to perform HARQ feedback for the MAC PDU, the first terminal device performs sidelink communication with the second terminal device, and the MAC PDU is in initial transmission on the sl grant.

According to the eleventh embodiment, in some possible implementations, the first request message includes control information; and the processing module is further configured to set a HARQ feedback attribute in the control information to enabled.

According to the eleventh embodiment, in some possible implementations, the control information is SCI.

According to the eleventh embodiment, in some possible implementations, the communication apparatus further includes a receiving module, configured to receive HARQ feedback information sent by the second terminal device; and the sending module is further configured to: if the HARQ feedback information is acknowledgment information, send the acknowledgment information on the PUCCH resource; or if the HARQ feedback information is negative acknowledgment information, send the negative acknowledgment information on the PUCCH resource.

The twelfth embodiment provides a communication apparatus. The communication apparatus may be a chip or a system on chip in a first terminal device, or may be a functional module that is in the first terminal device and that is configured to implement the method in any one of the second embodiment or the possible implementations of the second embodiment. The communication apparatus may include a sending module and a processing module. The sending module is configured to: if the processing module determines that a HARQ feedback attribute of an LCH in a MAC PDU is enabled, and no associated PSFCH resource is configured for an sl grant used to send the MAC PDU, ignore the sl grant, where the MAC PDU is in initial transmission on the sl grant.

According to the twelfth embodiment, in some possible implementations, the sending module is specifically configured to skip sending the MAC PDU to a second terminal device by using the sl grant.

According to the twelfth embodiment, in some possible implementations, the processing module is further configured to: if determining, before assembling, that a HARQ feedback attribute of a to-be-assembled LCH is enabled, and no associated PSFCH resource is configured for the sl grant used to send the MAC PDU, skip generating a corresponding MAC PDU for the sl grant; or the processing module is further configured to: when determining a DST based on a priority of an LCH, if a HARQ attribute of an LCH having a highest priority is enabled, stop LCH sifting.

A thirteenth embodiment provides a communication apparatus. The communication apparatus may be a chip or a system on chip in a first terminal device, or may be a functional module that is in the first terminal device and that is configured to implement the method in any one of the third embodiment or the possible implementations of the third embodiment. The communication apparatus may include a sending module and a processing module. The sending module is configured to: if the processing module determines that a HARQ feedback attribute of an LCH in a MAC PDU is enabled, and no associated PSFCH resource is configured for an sl grant used to send the MAC PDU, send a second request message to a network side device, where the second request message requests to allocate a PSFCH resource to the first terminal device, and the MAC PDU is in initial transmission on the sl grant.

According to the thirteenth embodiment, in some possible implementations, the second request message includes the HARQ feedback attribute of the MAC PDU; and the sending module is specifically configured to send the HARQ feedback attribute of the MAC PDU to the network side device.

According to the thirteenth embodiment, in some possible implementations, the second request message includes a MAC control element CE or radio resource control RRC signaling.

According to the thirteenth embodiment, in some possible implementations, the second request message requests the network side device to allocate a PSFCH resource associated with the sl grant; or the second request message requests the network side device to reallocate a resource pool, where a PSFCH resource is configured in the resource pool.

A fourteenth embodiment provides a communication apparatus. The communication apparatus may be a chip or a system on chip in a network side device, or may be a functional module that is in the network side device and that is configured to implement the method in any one of the fourth embodiment or the possible implementations of the fourth embodiment. The communication apparatus may include a processing module, configured to: if a HARQ feedback attribute of at least one LCH configured for a first terminal device is enabled, configure one or more resource pools for the first terminal device, where a PSFCH resource is configured in at least one of the resource pools.

A fifteenth embodiment provides a communication apparatus. The communication apparatus may be a chip or a system on chip in a first terminal device, or may be a functional module that is in the first terminal device and that is configured to implement the method in any one of the fifth embodiment or the possible implementations of the fifth embodiment. The communication apparatus may include: a processing unit, configured to: if determining that a HARQ feedback attribute of an LCH in a MAC PDU is enabled, and no associated PSFCH resource is configured for an sl grant used to send the MAC PDU, enter an idle mode or a third mode, and perform resource reselection, where a PSFCH resource is configured in a reselected resource pool, and the MAC PDU is in initial transmission on the sl grant.

According to the fifteenth embodiment, in some possible implementations, the processing unit is further configured to switch to a sidelink mode 2 after entering the idle mode or the third mode.

According to a sixteenth embodiment, this application provides a communication apparatus. The communication apparatus may be a chip or a system on chip in a first terminal device, or may be a functional module that is in the first terminal device and that is configured to implement the method in any one of the sixth embodiment or the possible implementations of the sixth embodiment. The communication apparatus may include a processing unit, configured to: if determining that a HARQ feedback attribute of an LCH in a MAC PDU is enabled and no associated PSFCH resource is configured for an sl grant used to send the MAC PDU, reselect a communication destination DST, where the MAC PDU is in initial transmission on the sl grant.

According to the sixteenth embodiment, in some possible implementations, the DST is a DST determined based on an LCH or a MAC CE, and the LCH or the MAC CE has a highest priority in a plurality of LCHs or MAC CEs that satisfy a preset condition, where the preset condition includes at least: HARQ feedback attributes of the plurality of LCHs or MAC CEs are disabled.

A seventeenth embodiment provides a communication apparatus. The communication apparatus may be a chip or a system on chip in a first terminal device, or may be a functional module that is in the first terminal device and that is configured to implement the method in any one of the seventh embodiment or the possible implementations of the seventh embodiment. The communication apparatus may include a sending unit and a processing unit. The sending unit is configured to: if the processing unit determines that a HARQ feedback attribute of an LCH in a MAC PDU is enabled, and no associated PSFCH resource is configured for an sl grant used to send the MAC PDU, send a third request message to a second terminal device, where the third request message requests the second terminal device not to perform HARQ feedback for the MAC PDU.

According to the seventeenth embodiment, in some possible implementations, the third request message may include control information; and correspondingly, the processing unit is further configured to set a HARQ feedback attribute in the control information to disabled.

An eighteenth embodiment provides a communication apparatus, including a processor and a memory, where the processor is coupled to the memory, and the processor is configured to read and execute instructions in the memory, to implement the sidelink communication method in any one of the first embodiment to the tenth embodiment or the possible implementations of the first embodiment to the tenth embodiment.

A nineteenth embodiment provides a communication apparatus, including a processor and a memory, where the processor is coupled to the memory, and the processor is configured to read and execute instructions in the memory, to implement the sidelink communication method in any one of the fourth embodiment to the sixth embodiment or the possible implementations of the fourth embodiment to the sixth embodiment.

A twentieth embodiment provides a sidelink communication system, including the first terminal device and the second terminal device in any one of the first embodiment to the tenth embodiment or the possible implementations of the first embodiment to the tenth embodiment, where the first terminal device performs sidelink communication with the second terminal device.

A twenty-first embodiment provides a sidelink communication system, including the first terminal device and the second terminal device in any one of the first embodiment to the tenth embodiment or the possible implementations of the first embodiment to the tenth embodiment, and the network side device in any one of the fourth embodiment to the sixth embodiment or the possible implementations of the fourth embodiment to the sixth embodiment.

A twenty-second embodiment provides a computer-readable storage medium. The computer-readable storage medium stores instructions. When the instructions are run on a computer, the instructions are used to perform the sidelink communication method in any one of the first embodiment to the tenth embodiment or the possible implementations of the first embodiment to the tenth embodiment.

A twenty-third embodiment provides a computer program or a computer program product. When the computer program or the computer program product is executed on a computer, the computer is enabled to implement the sidelink communication method in any one of the first embodiment to the tenth embodiment or the possible implementations of the first embodiment to the tenth embodiment.

It should be understood that, the technical solutions in the eleventh embodiment to the twenty-third embodiment of this application are consistent with the technical solutions in the first embodiment to the tenth embodiment of this application. Beneficial effects achieved by the various embodiments and corresponding feasible implementations are similar, and details are not described again.

BRIEF DESCRIPTION OF THE DRAWINGS

To describe technical solutions in embodiments of this application or in the background more clearly, the following describes the accompanying drawings for describing embodiments of this application or the background.

DETAILED DESCRIPTION OF ILLUSTRATIVE EMBODIMENTS

The following describes embodiments of this application with reference to the accompanying drawings in embodiments of this application. In the following descriptions, reference is made to the accompanying drawings that form a part of this application and show specific aspects of embodiments of this application in an illustrative manner or in which specific aspects of embodiments of this application may be used. It should be understood that embodiments of this application may be used in other aspects, and may include structural or logical changes not depicted in the accompanying drawings. For example, it should be understood that the disclosure with reference to the described method may also be applied to a corresponding device or system for performing the method, and vice versa. For example, if one or more specific method steps are described, a corresponding device may include one or more units such as functional units for performing the described one or more method steps (for example, one unit for performing one or more steps; or a plurality of units, each of which is for performing one or more of a plurality of steps), even if such one or more units are not explicitly described or illustrated in the accompanying drawings. In addition, for example, if a specific apparatus is described based on one or more units such as a functional unit, a corresponding method may include one step for implementing functionality of one or more units (for example, one step for implementing functionality of one or more units; or a plurality of steps, each of which is for implementing functionality of one or more of a plurality of units), even if such one or more steps are not explicitly described or illustrated in the accompanying drawings. Further, it should be understood that features of various example embodiments and/or aspects described in this specification may be combined with each other, unless otherwise specified.

Figure 1:
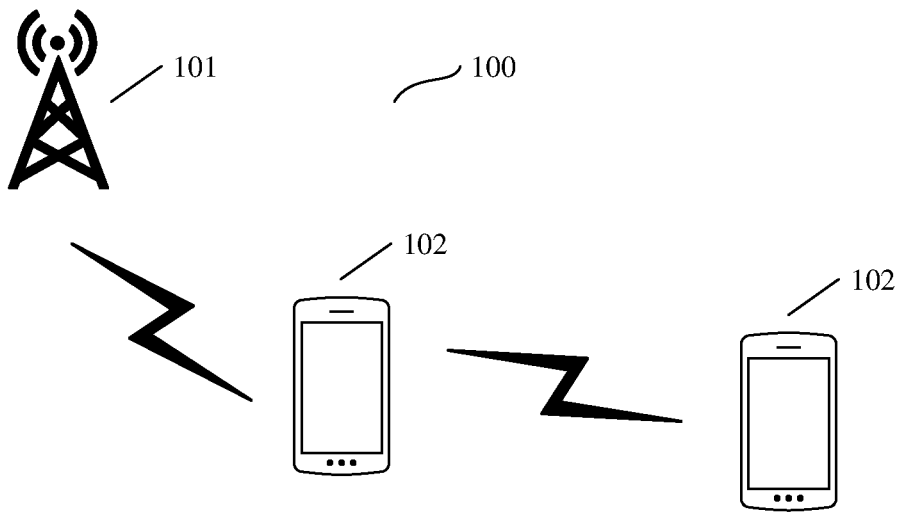
FIG. 1 is a schematic diagram of an SL communication system according to an embodiment of this application.

An embodiment of this application provides an SL communication system. FIG. 1 is a schematic diagram of an SL communication system 100 according to an embodiment of this application. Refer to FIG. 1, the SL system 100 may include a network side device 101 and a terminal device 102.

When communicating with the network side device, the terminal device may further communicate with another terminal device. The network side device may perform resource configuration, scheduling, coordination, and the like on a sidelink for communication between terminal devices, to assist the terminal devices in directly communicating with each other. Alternatively, the terminal device may perform resource configuration, scheduling, coordination, and the like on a sidelink for communication between the terminal device and another terminal device. This is not specifically limited in this embodiment of this application.

The network side device may be a device that is on an access network side and that is configured to support a terminal in accessing a wireless communication system. For example, the network side device may be a next generation NodeB (gNB), a transmission reception point (TRP), a relay node, an access point (AP), or a road side apparatus (RSU) in a 5G access technology communication system.

The terminal device may be a device that provides a voice or data connectivity for a user, for example, may also be referred to as UE, a mobile station, a subscriber unit, a station, or a terminal (TE). The terminal device may be a cellular phone, a personal digital assistant (PDA), a wireless modem, a handheld device, a laptop computer, a cordless phone, a wireless local loop (WLL) station, a tablet (pad), or the like. With development of wireless communication technologies, any device that can access a wireless communication system, communicate with a network side of a wireless communication system, or communicate with another device through a wireless communication system may be the terminal device in embodiments of this application, for example, a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. The terminal device may be stationary or mobile.

On an NR SL, a network side device, for example, a base station, configures a resource pool for SL communication between UEs. One resource pool is a set of time-frequency resources. A resource used by the UE to perform communication on the SL is determined from a preconfigured resource pool or the resource pool configured on the base station side. Specifically, there are two modes in which Tx UE determines, from a resource pool, a transmission resource used for communication on an SL: a mode 1 and a mode 2. The preconfigured resource may be obtained from a network element of a core network, or may be preset in the UE.

In the mode 1, a base station allocates an SL transmission resource to the Tx UE through scheduling. In this mode, when the Tx UE has to-be-transmitted data on the SL, the Tx UE reports an SL buffer status report (BSR) MAC CE to the base station through a Uu interface, to notify the base station of a current data amount of the to-be-transmitted data of the Tx UE on a PC5 interface. The base station may dynamically allocate the transmission resource to the Tx UE.

In the mode 2, the UE selects, as required, a transmission resource from a preconfigured resource pool or a resource pool configured by a base station, and the base station does not need to perform scheduling. The SL resource determined by the UE is configured by the base station (for example, configured by using RRC signaling or a system information block (SIB)), or is preconfigured. The preconfiguration herein may mean obtaining from a network element of a core network, or presetting in the UE.

Based on an uplink radio resource allocated by using an sl grant, UE needs to determine a total data amount of each LCH included in a newly transmitted MAC PDU, and if necessary, the UE further needs to allocate a resource to a MAC CE. In other words, an uplink resource allocated by a network side device to UE by using an sl grant is determined, and the UE determines, according to a configured LCH attribute and a rule specified in an existing protocol, LCHs whose data is to be placed in a MAC PDU and an amount of data that is of each LCH logical channel and that is to be placed in the MAC PDU.

Specifically, when TX UE newly transmits data on an sl grant, if the TX UE simultaneously establishes connections to a plurality of RX UEs, and LCHs with data belong to different DSTs, the TX UE first needs to determine a DST with which the sl grant is used for communication. For this sl grant, the TX UE selects an LCH or a MAC CE (namely, a first LCH or a first MAC CE) having a highest priority from LCHs or MAC CEs that satisfy the following first condition, and then the TX UE determines the DST for communication based on the selected first LCH or the first MAC CE.

Herein, the first condition may include:
1. there is SL data to be transmitted;
2. $SB_j > 0$; and
3. this sl grant is configured grant type1, sl-configuredSLGrantType1Allowed is configured for an LCH, and a value of sl-configuredSLGrantType1Allowed is true.

configured grant type1 indicates a sidelink configured grant type 1.

sl-configuredSLGrantType1Allowed indicates whether data of the LCH can be transmitted on a resource of the sidelink configured grant type 1.

Herein, the UE assembles a MAC PDU by using an algorithm similar to a token bucket. The UE determines, depending on whether there is a token and a quantity of tokens in the token bucket, whether to send data of an LCH, and determines a data amount, of the logical channel, assembled in the MAC PDU. The UE maintains a variable $SB_j$ for a $j^{th}$ LCH, where j is an integer greater than or equal to 1 and less than or equal to the quantity of tokens in the token bucket; and $SB_j$ indicates a quantity of currently available tokens in the token bucket, where each token corresponds to i-byte data. $SB_j$ is initialized to o when the LCH is established, and sPBR×T is added to $SB_j$ for each T, where T is time elapsed after $SB_j$ is last added. A value of $SB_j$ cannot exceed a maximum capacity of the token bucket.

Second, after the TX UE determines the DST based on the first condition, the TX UE needs to sift out first LCHs that satisfy the following second condition from first LCHs associated with the DST, and then the TX UE performs resource allocation on all the selected first LCHs.

Herein, the second condition may include:
1. there is SL data to be transmitted;
2. this sl grant is configured grant type1, sl-configuredSLGrantType1Allowed is configured for an LCH, and a value of sl-configuredSLGrantType1Allowed is true; and
3. a HARQ feedback attribute of the LCH is the same as a HARQ feedback attribute of the first LCH.

Finally, the TX UE assembles, into one MAC PDU, data of LCHs that belong to a same source and destination pair and have a same HARQ attribute.

In embodiments of this application, in one aspect, when a network side device configures a resource pool for UE, the network side device configures a physical sidelink shared channel (PSSCH) resource for the UE, and the UE transmits data on the PSSCH resource.

After receiving, through a PSSCH, data sent by TX UE, RX UE may feedback a HARQ answer message (for example, an acknowledgment (ACK) message or a negative acknowledgment (NACK) message) on a PSFCH resource. However, when configuring the resource pool, the network side device may configure a PSFCH resource for the resource pool, or may not configure any PSFCH resource for the resource pool. If the network side device configures the PSFCH resource for the resource pool, each sl grant in the resource pool has an associated PSFCH resource. Otherwise, if the network side device does not configure any PSFCH resource for the resource pool, each sl grant in the resource pool has no associated PSFCH resource.

In another aspect, when configuring, for the UE, an LCH that can be used for SL communication, the network side device may set a HARQ attribute of the SL LCH by using, for example, an sl-HARQ-feedback-enable field, where the HARQ attribute of the SL LCH is for per UE. If this field is set to enabled, it indicates that the SL LCH supports HARQ feedback; or if this field is set to disabled, it indicates that the SL LCH does not support HARQ feedback.

It can be learned that if a HARQ attribute of an LCH in a newly transmitted MAC PDU is disabled, RX UE does not send a HARQ feedback to TX UE, and the TX UE cannot perform HARQ feedback to a network side on a PUCCH resource. As a result, the network side considers that the TX UE does not receive any HARQ feedback, and further considers that decoding on the RX UE side fails. Consequently, retransmission is frequently scheduled for the RX UE, and resources are wasted. Alternatively, if a HARQ attribute of an LCH in a newly transmitted MAC PDU is enabled, but no PSFCH resource is configured for UE, a HARQ feedback attribute of the MAC PDU does not match a resource configured for the UE. As a result, unnecessary retransmission is caused or a packet loss is caused due to lack of retransmission.

To resolve the foregoing problem, embodiments of this application provide a sidelink communication method. The method may be applied to the foregoing sidelink communication system, and the UE may include a first terminal device and a second terminal device. In embodiments of this application, the first terminal device may be used as a transmit device (namely, TX UE), and the second terminal device may be used as a receive device (namely, RX UE).

Because that the network side device configures a resource pool for the TX UE may have two cases: a PSFCH resource is configured and no PSFCH resource is configured, the following separately describes the sidelink communication method based on the foregoing two cases.

In a first case, if a PSFCH resource has been configured in a resource pool configured by the network side device for the TX UE, an associated PSFCH resource has been configured for an sl grant used to send a MAC PDU.

Figure 2:
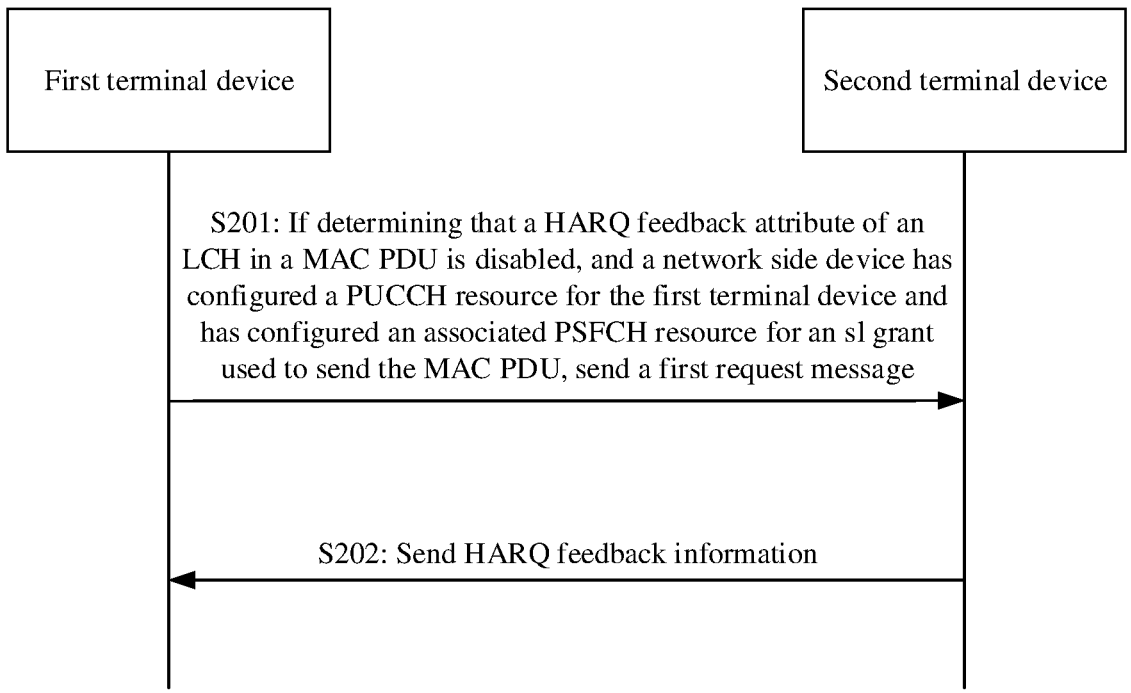
FIG. 2 is a first schematic flowchart of a sidelink communication method according to an embodiment of this application.

FIG. 2 is a first schematic flowchart of a sidelink communication method according to an embodiment of this application. Refer to FIG. 2. The method may include the following steps.

S201: If a first terminal device determines that a HARQ feedback attribute of an LCH in a MAC PDU is disabled, and a network side device has configured a PUCCH resource for the first terminal device and has configured an associated PSFCH resource for an sl grant used to send the MAC PDU, the first terminal device may send a first request message to a second terminal device.

The first request information requests the second terminal device to perform HARQ feedback for the MAC PDU. In other words, the first terminal device requests, by using the first request information, the second terminal to perform HARQ feedback for the MAC PDU.

S202: The second terminal device sends HARQ feedback information to the first terminal device in response to the first request message.

Herein, that the second terminal device responds to the first request message may be understood as that the second terminal device performs, based on the first request message, HARQ feedback for the MAC PDU after receiving the MAC PDU.

After assembling the MAC PDU by using the foregoing method, the first terminal device may determine a HARQ feedback attribute of each LCH in the MAC PDU. If the HARQ feedback attribute of the LCH is disabled, and the network side device has configured the PUCCH resource for the first terminal device and has configured the associated PSFCH resource for the sl grant used to send the MAC PDU, the first terminal device may request, by using the first request message, the second terminal device to perform HARQ feedback for the MAC PDU. After receiving the first request message, the second terminal device sends the HARQ feedback information, for example, an ACK message or a NACK message, to the first terminal device on the PSFCH resource in response to the first request message. The first terminal device receives the HARQ feedback information. Then, the first terminal device sends an answer message to the network side device on the PUCCH resource based on the received HARQ feedback information.

It should be noted that the MAC PDU in this embodiment of this application is in initial transmission on the sl grant, that is, data newly transmitted on the sl grant. Details are not described in the following embodiments.

In some possible implementations, the first request message may include but is not limited to control information. The control information may be SCI corresponding to the newly transmitted MAC PDU.

Correspondingly, before S201, the method may include: The first terminal device sets a HARQ feedback attribute in the control information to enabled. In other words, the first terminal device may set, to enabled, one or more bits that are in the control information and that are used to indicate the HARQ feedback attribute. In this case, after receiving the control information, the second terminal device may perform HARQ feedback for the corresponding MAC PDU based on the one or more bits. In an actual application, the bit that is in the control information and that indicates the HARQ feedback attribute may be set to o, to indicate "disabled". It is easy to understand that the bit may alternatively be set to 1, to indicate "enabled". Certainly, the bit that is in the control information and that indicates the HARQ feedback attribute may alternatively be represented in another manner. This is not specifically limited in this embodiment of this application.

In this embodiment of this application, when configuring a resource for the TX UE, the network side device further configures the corresponding PUCCH resource, so that the TX UE can perform HARQ feedback to the network side device on the PUCCH resource.

In this case, the method may further include: The first terminal device receives the HARQ feedback information sent by the second terminal device, namely, an answer message of the second terminal device for the first request information; and if the HARQ feedback information is an ACK, the first terminal device sends the ACK to the network side device on the PUCCH resource; or if the HARQ feedback information is a NACK, the first terminal device sends the NACK to the network side device on the PUCCH resource. After receiving the answer message sent by the first terminal device, the network side device does not frequently schedule retransmission for the RX UE, so that resources are saved.

In a second case, if no PSFCH resource is configured in a resource pool configured by the network side device for the TX UE, no associated PSFCH resource is configured for an sl grant used to send a MAC PDU. In this case, if a HARQ attribute of an LCH in the MAC PDU is enabled, because there is no PSFCH resource, the HARQ feedback attribute of the MAC PDU does not match a resource configured for the UE. As a result, unnecessary retransmission is caused or a packet loss is caused due to lack of retransmission.

Figure 3:
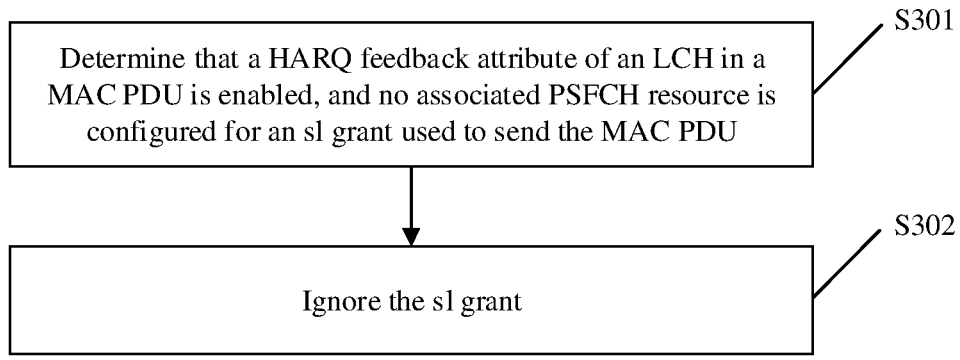
FIG. 3 is a second schematic flowchart of a sidelink communication method according to an embodiment of this application.

Therefore, in the second case, the foregoing problem may be resolved by using at least the following several solutions.
Solution 1:

FIG. 3 is a second schematic flowchart of a sidelink communication method according to an embodiment of this application. Refer to FIG. 3. The method may include the following steps.

S301: A first terminal device determines that a HARQ feedback attribute of an LCH in a MAC PDU is enabled, and no associated PSFCH resource is configured for an sl grant used to send the MAC PDU.

S302: The first terminal device ignores the sl grant.

When assembling the MAC PDU by using the foregoing method, the first terminal device may determine a HARQ feedback attribute of each LCH in the MAC PDU. If the LCH in the MAC PDU sent by the first terminal device on the sl grant supports HARQ feedback, it indicates that the HARQ feedback is expected to be performed for the MAC PDU; however, no associated PSFCH resource is configured for the sl grant. In this case, the first terminal device ignores the sl grant, to avoid a case in which the HARQ feedback attribute of the MAC PDU does not match a resource configured for UE, and further avoid unnecessary retransmission or a packet loss caused by lack of retransmission.

In some possible implementations, in S302, because the MAC PDU is assembled, that the first terminal device ignores the sl grant may be understood as that the first terminal device does not send the MAC PDU on the sl grant, or the first terminal device discards the MAC PDU. In this case, S301 may include: The first terminal device does not send the MAC PDU to the second terminal device by using the sl grant.

After a multiplexing and assembly entity in the first terminal device assembles data of LCHs that belong to a same source and destination pair and have a same HARQ attribute into one MAC PDU, a MAC entity in the first terminal may not send the MAC PDU to the second terminal device by using the sl grant.

In another embodiment of this application, the first terminal device may alternatively ignore the sl grant before assembling the MAC PDU. In this case, if the first terminal device determines that a HARQ feedback attribute of a to-be-assembled LCH is enabled, and no associated PSFCH resource is configured for an sl grant used for transmission, the first terminal device may ignore the sl grant, in other words, a multiplexing and assembly entity does not generate a corresponding MAC PDU for the sl grant. Alternatively, when the first terminal device determines a DST based on a priority of an LCH, if a HARQ attribute of an LCH having a highest priority is enabled, the multiplexing and assembly entity stops LCH sifting.

Figure 4:
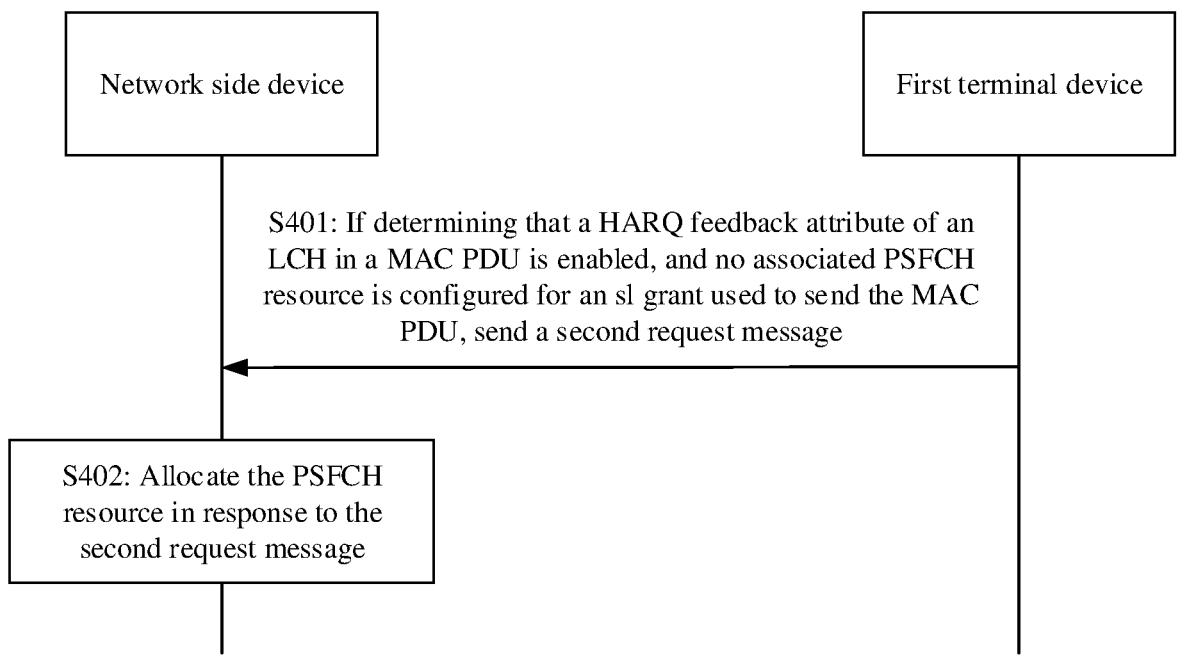
FIG. 4 is a third schematic flowchart of a sidelink communication method according to an embodiment of this application.

Solution 2:

FIG. 4 is a third schematic flowchart of a sidelink communication method according to an embodiment of this application. Refer to FIG. 4. The method may include the following steps.

S401: If a first terminal device determines that a HARQ feedback attribute of an LCH in a MAC PDU is enabled, and no associated PSFCH resource is configured for an sl grant used to send the MAC PDU, the first terminal device sends a second request message to a network side device.

The second request message requests to allocate a PSFCH resource to a terminal device (the first terminal device and/or a second terminal device). In other words, the first terminal device requests, from the network side device by using the second request information, the PSFCH resource associated with the sl grant used to send the MAC PDU.

S402: The network side device allocates the PSFCH resource in response to the second request message.

When assembling the MAC PDU by using the foregoing method, the first terminal device may determine a HARQ feedback attribute of each LCH in the MAC PDU. If the HARQ feedback attribute of the LCH is enabled, but no associated PSFCH resource is configured for the sl grant used to send the MAC PDU, the first terminal device sends the second request message to the network side device, and the network side device may allocate the PSFCH resource to the terminal device based on the second request message, so that the second terminal device may perform HARQ feedback for the MAC PDU on the newly configured PSFCH resource, to avoid a case in which the HARQ feedback attribute of the MAC PDU does not match a resource configured for UE, and further avoid unnecessary retransmission or a packet loss caused by lack of retransmission.

Herein, that the network side device responds to the second request message may be understood as that the network side device determines, based on the second request message, to allocate the PSFCH resource to the first terminal device.

In some possible implementations, the second request message may include the HARQ feedback attribute of the MAC PDU; and that the first terminal device sends a second request message to a network side device includes: The first terminal device sends the HARQ feedback attribute of the MAC PDU to the network side device.

In some possible implementations, the second request message may include a MAC CE or RRC signaling. Certainly, other signaling may be further included. This is not specifically limited in this embodiment of this application.

In this embodiment of this application, the second request message directly indicates, by using signaling, the network side device to allocate the PSFCH resource, or may indicate the HARQ feedback attribute of the MAC PDU by using signaling, so that the network side device may allocate the PSFCH resource based on the HARQ feedback attribute of the MAC PDU.

Figure 5:
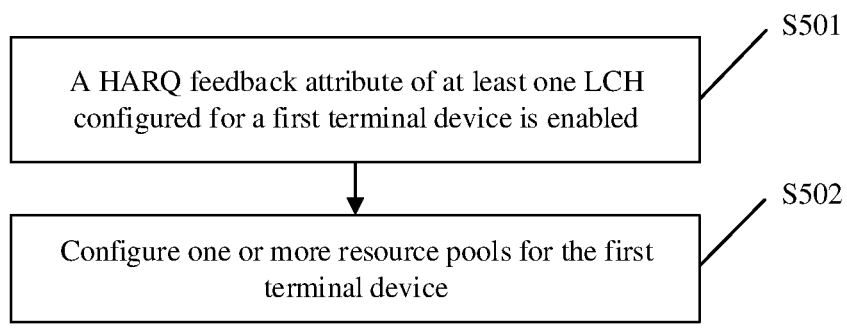
FIG. 5 is a fourth schematic flowchart of a sidelink communication method according to an embodiment of this application.

In some possible implementations, S402 may include: The network side device reconfigures a PSFCH resource associated with the sl grant; or the network side device reallocates a resource pool, where a PSFCH resource is configured in the reallocated resource pool.
Solution 3:

FIG. 5 is a fourth schematic flowchart of a sidelink communication method according to an embodiment of this application. Refer to FIG. 5. The method may include the following steps.

S501: A HARQ feedback attribute of at least one LCH configured by a network side device for a terminal device (a first terminal device and/or a second terminal device) is enabled.

S502: The network side device configures one or more resource pools for the terminal device.

Herein, a PSFCH resource is configured in at least one of the resource pools configured this time. In other words, during resource pool configuration, if an attribute of at least one LCH is enabled, at least one resource pool has a PSFCH resource; or during LCH configuration, if an attribute of at least one LCH is enabled, at least one resource pool has a PSFCH resource; or during LCH configuration, an attribute of one or more LCHs can be set to enabled only if at least one resource pool has a PSFCH resource.

When the network side device configures one or more resource pools for the terminal device, if the terminal device configures at least one LCH whose HARQ feedback attribute is enabled, at least one resource pool has a PSFCH resource. In other words, the network side device can configure, for the terminal device, an LCH whose HARQ feedback attribute is enabled, only if the network side device configures at least one resource pool for the terminal device, where the at least one resource pool has a PSFCH resource. Alternatively, when the network side device configures one or more LCHs for the terminal device, if an attribute of at least one of the LCHs is enabled, at least one resource pool has a PSFCH resource. In this case, if the network side device configures one or more resource pools for the terminal device, and a PSFCH resource is configured in at least one of the configured resource pools, the second terminal device may perform HARQ feedback for a MAC PDU on the configured PSFCH resource, to avoid a case in which the HARQ feedback attribute of the MAC PDU does not match a resource configured for UE, and further avoid unnecessary retransmission or packet loss caused by lack of retransmission.

In this embodiment of this application, if the network side device configures one resource pool for the terminal device, a PSFCH resource is correspondingly configured in the resource pool; or if the network side device configures a plurality of resource pools for the terminal device, a PSFCH resource needs to be configured in at least one of the plurality of resource pools. In this case, if the terminal device determines that the HARQ attribute of the LCH in the MAC PDU is enabled, the second terminal device may send HARQ feedback information of the MAC PDU to the first terminal device on the PSFCH resource.

Figure 6:
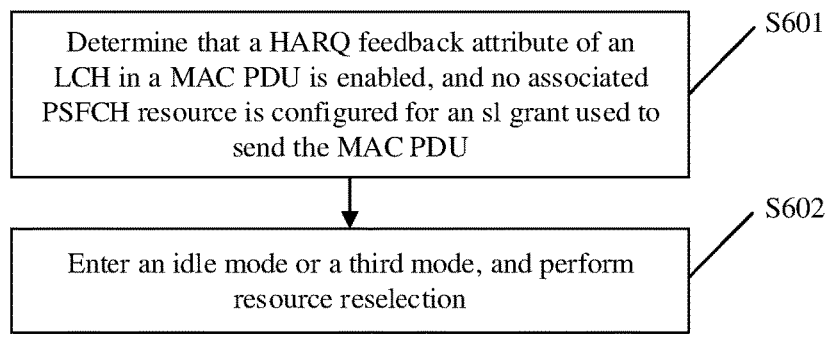
FIG. 6 is a fifth schematic flowchart of a sidelink communication method according to an embodiment of this application.

Solution 4:

FIG. 6 is a fifth schematic flowchart of a sidelink communication method according to an embodiment of this application. Refer to FIG. 6. The method may include the following steps.

S601: A first terminal device determines that a HARQ feedback attribute of an LCH in a MAC PDU is enabled, and no associated PSFCH resource is configured for an sl grant used to send the MAC PDU.

S602: The first terminal device enters an idle mode or a third (inactive) mode, and performs resource reselection.

A PSFCH resource is configured in a reselected resource pool.

When assembling the MAC PDU by using the foregoing method, the first terminal device may determine a HARQ feedback attribute of each LCH in the MAC PDU. If the HARQ feedback attribute of the LCH is enabled, but no associated PSFCH resource is configured for the sl grant used to send the MAC PDU, the first terminal device may enter the idle mode or the third mode. In the idle mode or the third mode, which is also referred to as the inactive mode, the first terminal device may perform resource reselection, to select the resource pool in which the PSFCH resource is configured. In this way, after receiving the MAC PDU, the second terminal device may send a HARQ feedback on the PSFCH resource corresponding to the reselected resource pool, to avoid a case in which the HARQ feedback attribute of the MAC PDU does not match a resource configured for UE, and further avoid unnecessary retransmission or a packet loss caused by lack of retransmission.

In some possible implementations, the method further includes: The first terminal device switches to a sidelink mode 2 after entering the idle mode or the third mode. In the sidelink mode 2, the first terminal device may perform resource selection, without needing scheduling performed by a network side device. Therefore, after entering the idle mode or the third mode, the first terminal device may independently perform resource selection.

Figure 7:
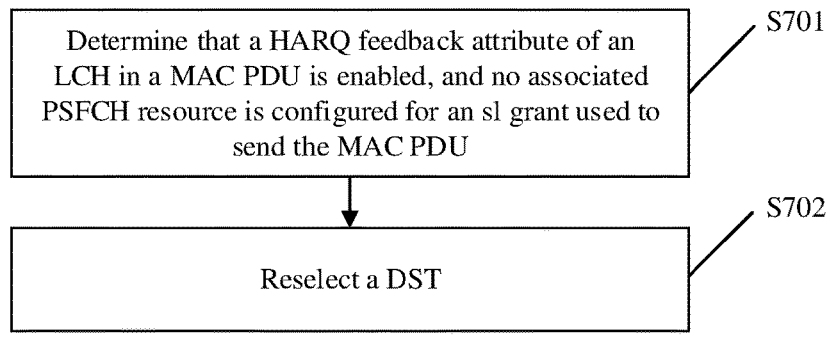
FIG. 7 is a sixth schematic flowchart of a sidelink communication method according to an embodiment of this application.

Solution 5:

FIG. 7 is a sixth schematic flowchart of a sidelink communication method according to an embodiment of this application. Refer to FIG. 7. The method may include the following steps.

S701: A first terminal device determines that a HARQ feedback attribute of an LCH in a MAC PDU is enabled, and no associated PSFCH resource is configured for an sl grant used to send the MAC PDU.

S702: The first terminal device reselects a DST.

When assembling the MAC PDU by using the foregoing method, the first terminal device may determine a HARQ feedback attribute of each LCH in the MAC PDU. If the HARQ feedback attribute of the LCH is enabled, but no associated PSFCH resource is configured for the sl grant used to send the MAC PDU, the first terminal device reselects the DST, and a HARQ feedback attribute of an LCH associated with the reselected DST may be disabled, to avoid a case in which the HARQ feedback attribute of the MAC PDU does not match a resource configured for UE, and further avoid unnecessary retransmission or a packet loss caused by lack of retransmission.

In a possible implementation, a process in which the first terminal device reselects the DST is as follows:

First, the first terminal device selects an LCH or a MAC CE (namely, a second LCH or a second MAC CE) having a highest priority from LCHs or MAC CEs that satisfy the following third condition, and determines the DST for communication based on the LCH.

Herein, the third condition may include that a HARQ attribute of an LCH is disabled.

Further, the third condition may further include at least one of the following:

1. there is SL data to be transmitted;
2. $SB_j > 0$; and
3. this sl grant is configured grant type1, sl-configuredSLGrantType1Allowed is configured for an LCH, and a value of sl-configuredSLGrantType1Allowed is true.

configured grant type1 indicates a sidelink configured grant type 1.

sl-configuredSLGrantType1Allowed indicates whether data of the LCH can be transmitted on a resource of the sidelink configured grant type 1.

It should be noted that, in this embodiment of this application, the first terminal device may select an LCH or a MAC CE from LCHs or MAC CEs that satisfy the condition "a HARQ attribute of an LCH is disabled" in the third condition, or may select an LCH or a MAC CE from LCHs or MAC CEs that satisfy the condition "a HARQ attribute of an LCH is disabled" and that satisfy a part of all of the foregoing 1 to 3 conditions.

In this embodiment of this application, after determining the DST, if LCHs associated with the DST include LCHs that satisfy the following fourth condition, the first terminal device needs to sift out the LCHs, and then performs resource allocation on all the sifted out LCHs.

Herein, the fourth condition may include at least one of the following:
1. there is SL data to be transmitted;
2. if this sl grant is configured grant type1, sl-configuredSLGrantType1Allowed is configured for an LCH, and a value of sl-configuredSLGrantType1Allowed is true; and
3. a HARQ feedback attribute of the LCH is the same as a HARQ feedback attribute of a second LCH.

It should be noted that, in this embodiment of this application, the first terminal device may sift out, based on all or a part of the conditions in the fourth condition, LCHs from the LCHs associated with the DST.

Finally, the first terminal device assembles, into one MAC PDU, data of LCHs that belong to a same source and destination pair and have a same HARQ feedback attribute.

In some possible implementation solutions, the third condition and the fourth condition may further include another condition. This is not specifically limited in this embodiment of this application.

Figure 8:
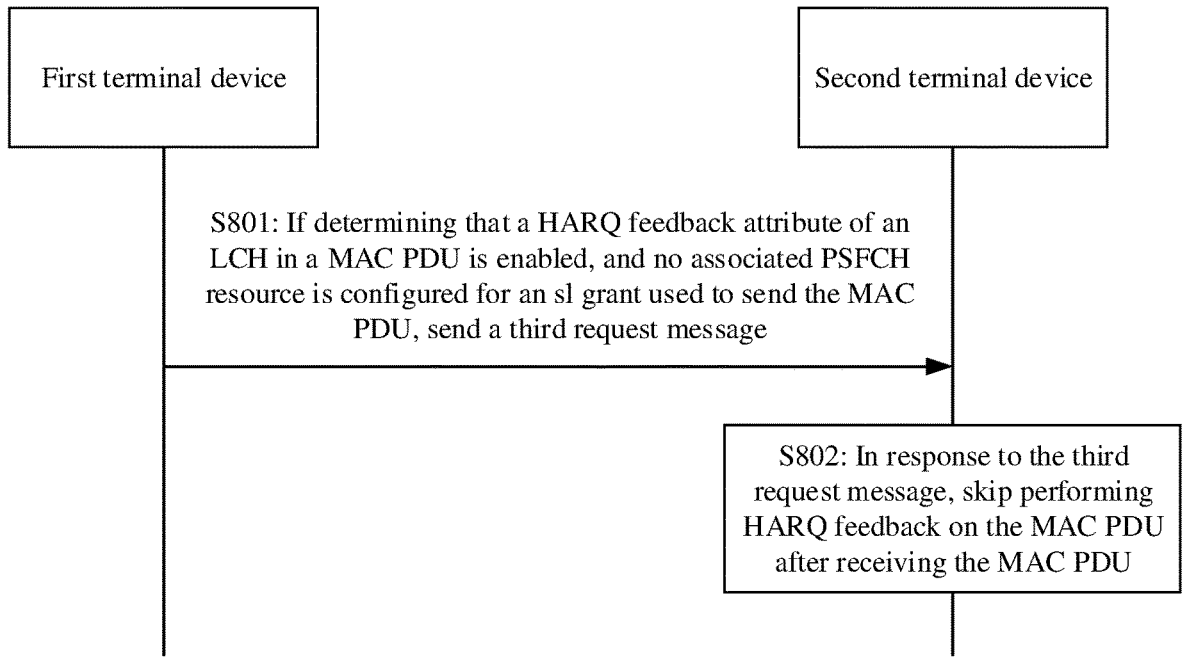
FIG. 8 is a seventh schematic flowchart of a sidelink communication method according to an embodiment of this application.

Solution 6:

FIG. 8 is a seventh schematic flowchart of a sidelink communication method according to an embodiment of this application. Refer to FIG. 8. The method may include the following steps.

S801: If a first terminal device determines that a HARQ feedback attribute of an LCH in a MAC PDU is enabled, and no associated PSFCH resource is configured for an sl grant used to send the MAC PDU, the first terminal device sends a third request message to a second terminal device.

The third request message requests the second terminal device not to perform HARQ feedback for the MAC PDU. In other words, the first terminal device requests, by using the third request information, the second terminal not to perform HARQ feedback for the MAC PDU.

S802: In response to the third request message, the second terminal device does not perform HARQ feedback for the MAC PDU after receiving the MAC PDU.

When assembling the MAC PDU by using the foregoing method, the first terminal device may determine a HARQ feedback attribute of each LCH in the MAC PDU. If the HARQ feedback attribute of the LCH is enabled, but no associated PSFCH resource is configured for the sl grant used to send the MAC PDU, the first terminal device may send the third request message to the second terminal device, to request the second terminal device not to perform HARQ feedback for the MAC PDU, to avoid a case in which the HARQ feedback attribute of the MAC PDU does not match a resource configured for UE, and further avoid unnecessary retransmission or packet loss caused by lack of retransmission.

Herein, that the second terminal device responds to the third request message may be understood as that the second terminal device does not perform, based on the third request message, HARQ feedback for the MAC PDU after receiving the MAC PDU.

In this embodiment of this application, the third request message may include but is not limited to control information. The control information may be SCI.

Correspondingly, before S801, the method may include: The first terminal device sets a HARQ feedback attribute in the control information to disabled. In other words, the first terminal device may set, to disabled, one or more bits (for example, one bit) that are in the control information and that are used to indicate the HARQ feedback attribute. In this case, after receiving the control information, the second terminal device may not perform HARQ feedback for the corresponding MAC PDU based on the bit.

Figure 9:
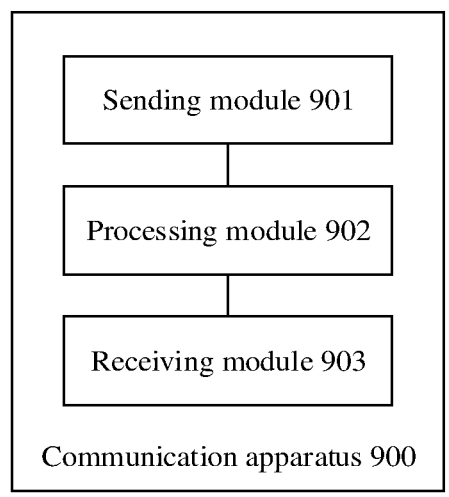
FIG. 9 is a first schematic diagram of a structure of a communication apparatus according to an embodiment of this application.

Based on a same inventive concept, an embodiment of this application further provides a communication apparatus. The communication apparatus may be a chip or a system on chip in a first terminal device, or may be a functional module that is in the first terminal device and that is configured to implement the method in any one of the foregoing possible implementations. The chip or the system on chip includes a memory, and the memory stores instructions. When the instructions are invoked by the system on chip or the chip, the foregoing method is performed. FIG. 9 is a first schematic diagram of a structure of a communication apparatus according to an embodiment of this application. Refer to FIG. 9. The communication apparatus 900 may include a sending module 901 and a processing module 902. The sending module 901 is configured to: if the processing module 902 determines that a HARQ feedback attribute of an LCH in a MAC PDU is disabled, and an associated PSFCH resource has been configured for an sl grant used to send the MAC PDU, send a first request message to a second terminal device, where the first request message requests the second terminal device to perform HARQ feedback for the MAC PDU, the first terminal device performs sidelink communication with the second terminal device, and the MAC PDU is in initial transmission on the sl grant.

In some possible implementations, the first request message includes control information; and the processing module is further configured to set a HARQ feedback attribute in the control information to enabled.

In some possible implementations, the control information is SCI.

In some possible implementations, as shown in FIG. 9, the communication apparatus 900 further includes a receiving module 903, configured to receive HARQ feedback information sent by the second terminal device; and the sending module is further configured to: if the HARQ feedback information is acknowledgment information, send the acknowledgment information on a PUCCH resource; or if the HARQ feedback information is negative acknowledgment information, send the negative acknowledgment information on a PUCCH resource.

It should be noted that the sending module may be a sending interface, a sending circuit, a transmitter, or the like; the receiving module may be a receiving interface, a receiving circuit, a receiver, or the like; and the processing module may be one or more processors.

Based on a same inventive concept, an embodiment of this application further provides a communication apparatus. The communication apparatus may be a chip or a system on chip in a first terminal device, or may be a functional module that is in the first terminal device and that is configured to implement the method in any one of the foregoing possible implementations. The chip or the system on chip includes a memory, and the memory stores instructions. When the instructions are invoked by the system on chip or the chip, the foregoing method is performed. Still refer to FIG. 9. The communication apparatus 900 may include a sending module 901 and a processing module 902. The sending module 901 is configured to: if the processing module 902 determines that a HARQ feedback attribute of an LCH in a MAC PDU is enabled, and no associated PSFCH resource is configured for an sl grant used to send the MAC PDU, ignore the sl grant, where the MAC PDU is in initial transmission on the sl grant.

In some possible implementations, the sending module is specifically configured to skip sending the MAC PDU to a second terminal device by using the sl grant.

In some possible implementations, the processing module is further configured to: if determining, before assembling, that a HARQ feedback attribute of a to-be-assembled LCH is enabled, and no associated PSFCH resource is configured for the sl grant used to send the MAC PDU, the processing module may ignore the sl grant, for example, the processing module does not generate a corresponding MAC PDU for the sl grant, that is, do not perform assembling for the sl grant; or when determining a DST based on a priority of an LCH, if a HARQ attribute of an LCH having a highest priority is enabled, stop LCH sifting.

It should be noted that the sending module may be a sending interface, a sending circuit, a transmitter, or the like, and the processing module may be one or more processors.

Based on a same inventive concept, an embodiment of this application further provides a communication apparatus. The communication apparatus may be a chip or a system on chip in a first terminal device, or may be a functional module that is in the first terminal device and that is configured to implement the method in any one of the foregoing possible implementations. The chip or the system on chip includes a memory, and the memory stores instructions. When the instructions are invoked by the system on chip or the chip, the foregoing method is performed. Still refer to FIG. 9. The communication apparatus 900 may include a sending module 901 and a processing module 902. The sending module 901 is configured to: if the processing module 902 determines that a HARQ feedback attribute of an LCH in a MAC PDU is enabled, and no associated PSFCH resource is configured for an sl grant used to send the MAC PDU, send a second request message to a network side device, where the second request message requests to allocate a PSFCH resource to the first terminal device, and the MAC PDU is in initial transmission on the sl grant.

In some possible implementations, the second request message may include the HARQ feedback attribute of the MAC PDU; and that the first terminal device sends a second request message to a network side device includes: The first terminal device sends the HARQ feedback attribute of the MAC PDU to the network side device.

In some possible implementations, the second request message may include a MAC CE or RRC signaling. Certainly, other signaling may be further included. This is not specifically limited in this embodiment of this application.

In some possible implementations, the second request message requests the network side device to allocate a PSFCH resource associated with the sl grant; or the second request message requests the network side device to reallocate a resource pool, where a PSFCH resource is configured in the resource pool.

It should be noted that the sending module may be a sending interface, a sending circuit, a transmitter, or the like, and the processing module may be one or more processors.

Based on a same inventive concept, an embodiment of this application further provides a communication apparatus. The communication apparatus may be a chip or a system on chip in a network side device, or may be a functional module that is in the network side device and that is configured to implement the method in any one of the foregoing possible implementations. The chip or the system on chip includes a memory, and the memory stores instructions. When the instructions are invoked by the system on chip or the chip, the foregoing method is performed. Still refer to FIG. 9. The communication apparatus may include a processing module 902, configured to: if a HARQ feedback attribute of at least one LCH configured for a first terminal device is enabled, configure one or more resource pools for the first terminal device, where a PSFCH resource is configured in at least one of the resource pools.

It should be noted that the processing module may be one or more processors.

Based on a same inventive concept, an embodiment of this application further provides a communication apparatus. The communication apparatus may be a chip or a system on chip in a first terminal device, or may be a functional module that is in the first terminal device and that is configured to implement the method in any one of the foregoing possible implementations. The chip or the system on chip includes a memory, and the memory stores instructions. When the instructions are invoked by the system on chip or the chip, the foregoing method is performed. Still refer to FIG. 9. The communication apparatus 900 may include a processing unit 902, configured to: if determining that a HARQ feedback attribute of an LCH in a MAC PDU is enabled, and no associated PSFCH resource is configured for an sl grant used to send the MAC PDU, enter an idle mode or a third mode, and perform resource reselection, where a PSFCH resource is configured in a reselected resource pool, and the MAC PDU is in initial transmission on the sl grant.

In some possible implementations, the processing unit is further configured to switch to a sidelink mode 2 after entering the idle mode or the third mode.

It should be noted that the processing module may be one or more processors.

Based on a same inventive concept, an embodiment of this application further provides a communication apparatus. The communication apparatus may be a chip or a system on chip in a first terminal device, or may be a functional module that is in the first terminal device and that is configured to implement the method in any one of the foregoing possible implementations. The chip or the system on chip includes a memory, and the memory stores instructions. When the instructions are invoked by the system on chip or the chip, the foregoing method is performed. Still refer to FIG. 9. The communication apparatus 900 may include a processing unit 902, configured to: if determining that a HARQ feedback attribute of an LCH in a MAC PDU is enabled and no associated PSFCH resource is configured for an sl grant used to send the MAC PDU, reselect a communication destination DST, where the MAC PDU is in initial transmission on the sl grant.

In some possible implementations, the DST is a DST determined based on an LCH or a MAC CE, and the LCH or the MAC CE has a highest priority in a plurality of LCHs or MAC CEs that satisfy a preset condition, where the preset condition includes at least: HARQ feedback attributes of the plurality of LCHs or MAC CEs are disabled.

It should be noted that the processing module may be one or more processors.

Based on a same inventive concept, an embodiment of this application further provides a communication apparatus. The communication apparatus may be a chip or a system on chip in a first terminal device, or may be a functional module that is in the first terminal device and that is configured to implement the method in any one of the foregoing possible implementations. The chip or the system on chip includes a memory, and the memory stores instructions. When the instructions are invoked by the system on chip or the chip, the foregoing method is performed. Still refer to FIG. 9. The communication apparatus 900 may include a sending module 901 and a processing module 902. The sending module 901 is configured to: if the processing module determines that a HARQ feedback attribute of an LCH in a MAC PDU is enabled, and no associated PSFCH resource is configured for an sl grant used to send the MAC PDU, send a third request message to a second terminal device, where the third request message requests the second terminal device not to perform HARQ feedback for the MAC PDU.

In some possible implementations, the third request message may include control information; and the processing module is configured to set a HARQ feedback attribute in the control information to disabled.

Figure 10:
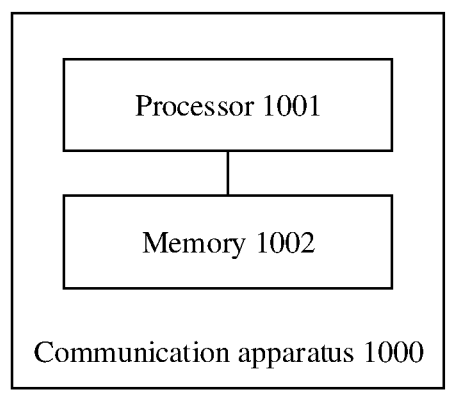
FIG. 10 is a second schematic diagram of a structure of a communication apparatus according to an embodiment of this application.

Based on a same inventive concept, an embodiment of this application provides a communication apparatus, which may be a terminal device. The terminal device may be consistent with the first terminal device in the foregoing one or more embodiments. FIG. 10 is a second schematic diagram of a structure of a terminal device according to an embodiment of this application. Refer to FIG. 10. The communication apparatus moo includes a processor 1001 and a memory. The processor 1001 is coupled to the memory 1002, and the processor 1001 is configured to read and execute instructions in the memory 1002. The processor 1001 is configured to: if the processor 1001 determines that a HARQ feedback attribute of an LCH in a MAC PDU is disabled, and a network side device has configured a PUCCH resource for the terminal device and has configured an associated PSFCH resource for an sl grant used to send the MAC PDU, send a first request message to a second terminal device, where the first request message requests the second terminal device to perform HARQ feedback for the MAC PDU, and the MAC PDU is in initial transmission on the sl grant.

In some possible implementations, the first request message includes control information; and the processor is further configured to set a HARQ feedback attribute in the control information to enabled.

In some possible implementations, the control information is SCI.

In some possible implementations, the processor is further configured to receive HARQ feedback information sent by the second terminal device; and is further configured to: if the HARQ feedback information is acknowledgment information, send the acknowledgment information on the PUCCH resource; or if the HARQ feedback information is negative acknowledgment information, send the negative acknowledgment information on the PUCCH resource.

Based on a same inventive concept, an embodiment of this application provides a communication apparatus, which may be a terminal device. The terminal device may be consistent with the first terminal device in the foregoing one or more embodiments. Still refer to FIG. 10. The communication apparatus moo includes a processor 1001 and a memory. The processor 1001 is coupled to the memory 1002, and the processor 1001 is configured to read and execute instructions in the memory 1002. The processor 1001 is configured to: if the processor 1001 determines that a HARQ feedback attribute of an LCH in a MAC PDU is enabled and no associated PSFCH resource is configured for an sl grant used to send the MAC PDU, ignore the sl grant, where the MAC PDU is in initial transmission on the sl grant.

In some possible implementations, the processor 1001 is configured not to send the MAC PDU to the second terminal device by using the sl grant.

In some possible implementations, the processor 1001 is further configured to: if determining, before assembling, that a HARQ feedback attribute of a to-be-assembled LCH is enabled, and no associated PSFCH resource is configured for the sl grant used to send the MAC PDU, skip generating a corresponding MAC PDU for the sl grant; or the processor 1001 is further configured to: when determining a DST based on a priority of an LCH, if a HARQ attribute of an LCH having a highest priority is enabled, stop LCH sifting.

Based on a same inventive concept, an embodiment of this application provides a terminal device. The terminal device may be consistent with the first terminal device in the foregoing one or more embodiments. Still refer to FIG. 10. The terminal device moo includes a processor 1001, a memory 1002, and a communication interface 1003. The processor 1001 is coupled to the memory 1002. The communication interface 1003 is configured to: if the processor 1001 determines that a HARQ feedback attribute of an LCH in a MAC PDU is enabled, and no associated PSFCH resource is configured for an sl grant used to send the MAC PDU, send a second request message to a network side device, where the second request message requests to allocate a PSFCH resource to the first terminal device, and the MAC PDU is in initial transmission on the sl grant.

In some possible implementations, the second request message includes the HARQ feedback attribute of the MAC PDU; and the communication interface 1003 is configured to send the HARQ feedback attribute of the MAC PDU to the network side device.

In some possible implementations, the second request message includes a MAC control element CE or radio resource control RRC signaling.

In some possible implementations, the second request message requests the network side device to allocate a PSFCH resource associated with the sl grant; or the second request message requests the network side device to reallocate a resource pool, where a PSFCH resource is configured in the resource pool.

Based on a same inventive concept, an embodiment of this application provides a communication apparatus, which may be a network side device. The network side device may be consistent with the network side device in the foregoing one or more embodiments. Still refer to FIG. 10. The communication apparatus moo includes a processor 1001 and a memory 1002. The processor 1001 is coupled to the memory 1002, and the processor 1001 is configured to read and execute instructions in the memory 1002. The processor 1001 is configured to: if a HARQ feedback attribute of at least one LCH configured for a first terminal device is enabled, configure one or more resource pools for the first terminal device, where a PSFCH resource is configured in at least one of the resource pools.

Based on a same inventive concept, an embodiment of this application provides a communication apparatus, which may be a terminal device. The terminal device may be consistent with the first terminal device in the foregoing one or more embodiments. Still refer to FIG. 10. The communication apparatus woo includes a processor 1001 and a memory 1002. The processor 1001 is coupled to the memory 1002, and the processor 1001 is configured to read and execute instructions in the memory 1002. The processor 1001 is configured to: if determining that a HARQ feedback attribute of an LCH in a MAC PDU is enabled, and no associated PSFCH resource is configured for an sl grant used to send the MAC PDU, enter an idle mode or a third mode, and perform resource reselection, where a PSFCH resource is configured in a reselected resource pool, and the MAC PDU is in initial transmission on the sl grant.

In some possible implementations, the processor 1001 is further configured to switch to a sidelink mode 2 after entering the idle mode or the third mode.

Based on a same inventive concept, an embodiment of this application provides a communication apparatus, which may be a terminal device. The terminal device may be consistent with the first terminal device in the foregoing one or more embodiments. Still refer to FIG. 10. The communication apparatus woo includes a processor 1001 and a memory 1002. The processor 1001 is coupled to the memory 1002, and the processor 1001 is configured to read and execute instructions in the memory 1002. The processor 1001 is configured to: if determining that a HARQ feedback attribute of an LCH in a MAC PDU is enabled and no associated PSFCH resource is configured for an sl grant used to send the MAC PDU, reselect a communication destination DST, where the MAC PDU is in initial transmission on the sl grant.

In some possible implementations, the DST is a DST determined based on an LCH or a MAC CE, and the LCH or the MAC CE has a highest priority in a plurality of LCHs or MAC CEs that satisfy a preset condition, where the preset condition includes at least: HARQ feedback attributes of the plurality of LCHs or MAC CEs are disabled.

Based on a same inventive concept, an embodiment of this application provides a communication apparatus, which may be a terminal device. The terminal device may be consistent with the first terminal device in the foregoing one or more embodiments. Still refer to FIG. 10. The communication apparatus moo includes a processor 1001 and a memory 1002. The processor 1001 is coupled to the memory 1002, and the processor 1001 is configured to read and execute instructions in the memory 1002. The processor 1001 is configured to: if the processor 1001 determines that a HARQ feedback attribute of an LCH in a MAC PDU is enabled, and no associated PSFCH resource is configured for an sl grant used to send the MAC PDU, send a third request message to a second terminal device, where the third request message requests the second terminal device not to perform HARQ feedback for the MAC PDU.

In some possible implementations, the third request message may include control information. Correspondingly, the communication interface 1003 is further configured to, for example, set a HARQ feedback attribute in the control information to disabled.

Based on a same inventive concept, this application provides a sidelink communication system, including the first terminal device and the second terminal device in any one of the foregoing possible implementations, and the network side device in any one of the foregoing possible implementations.

Based on a same inventive concept, this application provides a computer-readable storage medium. The computer-readable storage medium stores instructions. When the instructions are run on a computer, the instructions are used to perform the sidelink communication method in any one of the foregoing possible implementations.

Based on a same inventive concept, this application provides a computer program or a computer program product. When the computer program or the computer program product is executed on a computer, the computer is enabled to implement the sidelink communication method in any one of the foregoing possible implementations.

A person skilled in the aft can appreciate that functions described with reference to various illustrative logical blocks, modules, and algorithm steps disclosed and described in this specification may be implemented by hardware, software, firmware, or any combination thereof. If the functions are implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or a data structure and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the above should also be included within the scope of the computer-readable medium.

Instructions may be executed by one or more processors such as one or more digital signal processors (DSPs), general microprocessors, application-specific integrated circuits (ASICs), field programmable gate arrays (FPGAs), or other equivalent integrated or discrete logic circuits. Therefore, the term "processor" used in this specification may refer to any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be fully implemented in one or more circuits or logic elements.

The technologies of this application may be implemented in various apparatuses or devices, including a wireless handset, an integrated circuit (IC), or a group of ICs (for example, a chip set). Various components, modules, or units described in this application are intended to emphasize a function aspect of an apparatus configured to perform the disclosed technology, but do not necessarily need to be implemented by different hardware units. Actually, as described above, various units may be combined, in combination with proper software and/or firmware, into a codec hardware unit, or be provided by interoperable hardware units (including one or more processors described above).

In the foregoing embodiments, the descriptions of each embodiment have respective focuses. For a part that is not described in detail in an embodiment, refer to related descriptions in other embodiments.

The foregoing descriptions are merely examples of specific implementations of this application, but are not intended to limit the protection scope of this application. Any variation or replacement readily figured out by a person skilled in the art within the technical scope disclosed in this application may be made, all shall fall within the protection scope of this application. Therefore, the protection scope of this application shall be subject to the protection scope of the claims.

What is claimed is:

1. A sidelink communication method, performed by a first terminal device or a chip of the first terminal device, the method comprising:
    determining that a hybrid automatic repeat request (HARQ) feedback attribute of at least one sidelink logical channel of the first terminal device is enabled; and
    obtaining, by the first terminal device from a network side device, one or more resource pools for the first terminal device,
    wherein in response to determining that the HARQ feedback attribute is enabled, a physical sidelink feedback channel (PSFCH) resource is configured in at least one of the resource pools,
    wherein obtaining the one or more resource pools comprises:
        sending, by the first terminal device, a request message to the network side device requesting allocation of the PSFCH resource; and
        receiving, by the first terminal device, configuration information of the one or more resource pools from the network side device in response to the request message.

2. The method according to claim 1, wherein the PSFCH resource is configured for transmitting HARQ feedback information.

3. The method according to claim 1, further comprising sending, by the first terminal device, a medium access control packet data unit (MAC PDU) to a second terminal device.

4. The method according to claim 3, further comprising receiving, by the first terminal device, HARQ feedback information for the MAC PDU on the PSFCH resource.

5. The method according to claim 3, wherein the one or more resource pools are sidelink resource pools.

6. A sidelink communication method, the method comprising:
    assembling, by a first terminal device, a medium access control packet data unit (MAC PDU);
    when the first terminal device determines that a hybrid automatic repeat request (HARQ) feedback attribute of a logical channel (LCH) in the MAC PDU is enabled and no associated physical sidelink feedback channel (PSFCH) resource is configured for a sidelink grant used to send the MAC PDU, and the MAC PDU is in initial transmission on the sidelink grant, ignoring, by the first terminal device, the sidelink grant; and
    determining, by the first terminal device prior to ignoring the sidelink grant, if any resource pool configured for the first terminal device has a PSFCH resource configured.

7. The method according to claim 6, wherein ignoring, by the first terminal device, the sidelink grant comprises skipping sending, by the first terminal device, the MAC PDU to a second terminal device by using the sidelink grant.

8. A sidelink communication method, the method comprising:
    determining, by a network side device, that a hybrid automatic repeat request (HARQ) feedback attribute of at least one sidelink logical channel configured by the network side device for a first terminal device is enabled; and
    configuring, by the network side device, one or more resource pools for the first terminal device,
    wherein in response to determining that the HARQ feedback attribute is enabled, a physical sidelink feedback channel (PSFCH) resource is configured in at least one of the resource pools,
    wherein the network side device configures the at least one sidelink logical channel with the HARQ feedback attribute enabled only when the PSFCH resource is configured in at least one of the resource pools for the first terminal device.

9. The method according to claim 8, wherein the PSFCH resource is configured for transmitting a HARQ feedback information.

10. The method according to claim 8, wherein the one or more resource pools are sidelink resource pools.

11. The method according to claim 1, further comprising:
    verifying, by the first terminal device, that the PSFCH resource is configured in at least one of the one or more resource pools; and
    using the at least one of the one or more resource pools with the configured PSFCH resource for sidelink communication.

12. The method according to claim 8, wherein configuring the one or more resource pools comprises:
    receiving, by the network side device, a request message from the first terminal device; and
    allocating, by the network side device, the PSFCH resource in response to the request message.

13. The method according to claim 8, further comprising:
    receiving, by the network side device from the first terminal device, information indicating the HARQ feedback attribute of the at least one sidelink logical channel.

14. The method according to claim 1, wherein when no PSFCH resource is configured in any of the resource pools, the method further comprises:
    entering, by the first terminal device, an idle mode or an inactive mode; and
    performing, by the first terminal device, resource reselection to select a new resource pool in which a PSFCH resource is configured.

15. The method according to claim 1, wherein when no PSFCH resource is configured in any of the resource pools, the method further comprises:
- reselecting, by the first terminal device, a communication destination for which a HARQ feedback attribute of an associated logical channel is disabled.

16. The method according to claim 6, further comprising:
- sending, by the first terminal device, a request message requesting allocation of the PSFCH resource prior to ignoring the sidelink grant.

\* \* \* \* \*